United States Patent
Post et al.

(10) Patent No.: US 6,315,366 B1
(45) Date of Patent: Nov. 13, 2001

(54) TAKE APART SAFETY VEHICLE WHEEL ASSEMBLY

(75) Inventors: Charles C. Post, Haslett, MI (US); James B. Weeks, Springfield, OH (US); Michael R. Bernard, Dewitt, MI (US); Joseph S. Reding, Chatham (CA); Gale Raymond, Grand Ledge, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/351,959

(22) Filed: Jul. 12, 1999

Related U.S. Application Data

(63) Continuation of application No. PCT/US98/00516, filed on Jan. 13, 1998.
(60) Provisional application No. 60/035,185, filed on Jan. 13, 1997.

(51) Int. Cl.[7] ..................................................... B60B 25/00
(52) U.S. Cl. .................. 301/11.1; 152/405; 152/DIG. 10
(58) Field of Search .................................... 301/9.1, 10.1, 301/11.1, 11.2, 23, 35.1; 152/396, 397, 398, 402, 405, DIG. 10

(56) References Cited

U.S. PATENT DOCUMENTS

| 4,165,777 | 8/1979 | Sano . |
| 4,466,670 | 8/1984 | Kaji . |
| 4,836,261 | 6/1989 | Weeks et al. . |
| 4,997,235 | * 3/1991 | Braungart ........................... 301/11.1 |
| 5,018,566 | 5/1991 | Thoni . |

FOREIGN PATENT DOCUMENTS

| 216168 | * 5/1957 | (AU) | ..................................... 152/402 |
| 512619 | * 8/1952 | (CA) | ..................................... 152/402 |
| 348883 | * 10/1960 | (CH) | ..................................... 152/398 |
| 4141868 | * 1/1993 | (DE) | ..................................... 301/10.1 |
| 2435044 | * 2/1975 | (DE) | ..................................... 301/11.1 |
| 602621 | * 3/1926 | (FR) | ..................................... 301/11.1 |
| 626258 | * 1/1927 | (FR) | ..................................... 301/11.1 |
| 1141234 | * 8/1957 | (FR) | ..................................... 301/11.1 |
| 325700 | * 2/1930 | (GB) | ..................................... 301/11.1 |
| 5024405 | * 2/1993 | (JP) | ..................................... 301/10.1 |

* cited by examiner

Primary Examiner—S. Joseph Morano
Assistant Examiner—Long Buo Nguyen
(74) Attorney, Agent, or Firm—MacMillan, Sobanski & Todd, LLC

(57) ABSTRACT

A take apart safety vehicle wheel assembly including a disc, an inner rim joined to the disc, and an outer rim joined to the disc. The disc has a generally centrally located wheel mounting surface and includes an outer annular flange which defines an outer cylindrical surface. The inner rim includes an inboard tire bead seat retaining flange, an inboard tire bead seat, a generally axially extending well, and an outboard tire bead seat which terminates at an axial endmost surface. The outer rim includes an inner mounting surface and outer annular flange. The outer annular flange of the outer rim defines an outboard tire bead seat retaining flange of the take apart safety vehicle wheel assembly and includes an inner surface. An elastomeric member disposed in a cavity defined by the axial endmost surface of the inner rim, the inner surface of the outer annular flange of the outer rim, and the outer cylindrical surface of the outer annular flange of the disc. The take apart safety vehicle wheel assembly further includes only a single weld to join the disc to the inner rim; the outer rim being joined to the disc by a plurality of nuts and bolts which are adapted to compress the elastomeric member in the cavity so as to provide an air-tight seal in the take apart safety vehicle wheel assembly between the associated surfaces of the inner rim, the outer rim, and the disc.

8 Claims, 4 Drawing Sheets

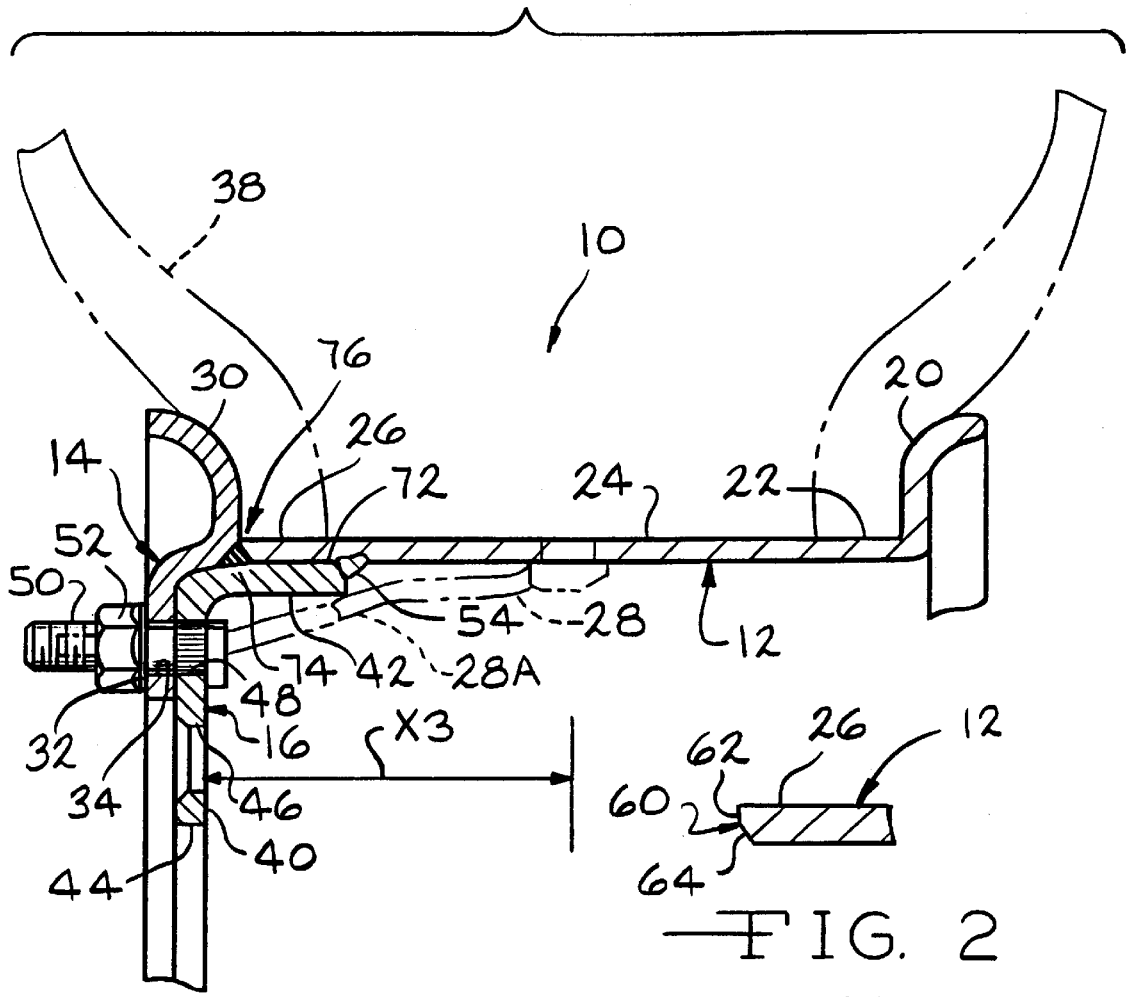
FIG 1
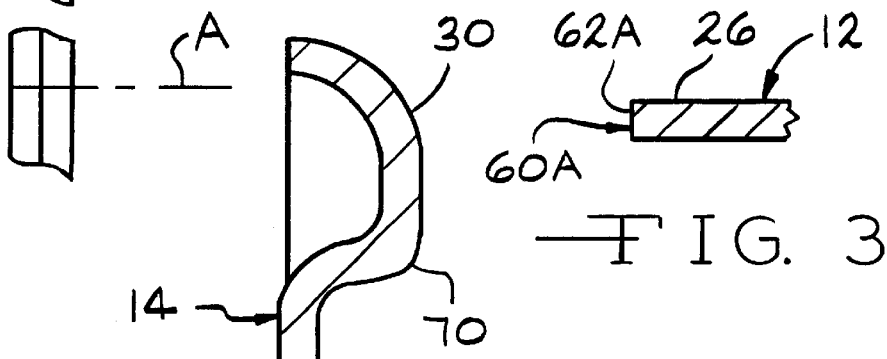
FIG. 2
FIG. 4
FIG. 3

TAKE APART SAFETY VEHICLE WHEEL ASSEMBLY

This application is a continuation of PCT/US98/00516 filed Jan. 13, 1998 and claims benefit of Prov. No. 60/035,185 filed Jan. 13, 1997.

BACKGROUND OF THE INVENTION

This invention relates in general to vehicle wheel assemblies and in particular to an improved take apart safety vehicle wheel assembly.

U.S. Pat. No. 4,836,261 to Weeks et al. discloses a prior art take apart safety vehicle wheel assembly. As shown in the Weeks et al. patent, the prior art take apart safety vehicle wheel assembly includes an inner rim, an outer rim, a wheel mounting disc, and a clamp ring. The wheel mounting disc is welded to the inner rim, and the clamp ring is welded to the outer rim. Threaded stud bolts extend through apertures formed through the wheel mounting disc and the clamp ring. Nuts are installed on and tightened on the stud bolts to secure the outer rim and clamp ring to the inner rim and wheel mounting disc.

As further shown in the Weeks et al. patent, the outboard tire bead seat surface of the inner rim terminates at a machined inclined surface, and the inboard free edge of the outer rim part terminates at a machined inclined surface. When the safety take apart vehicle wheel assembly is assembled, the inclined outer and inner rim surfaces cooperate with an outer surface of the wheel mounting disc define a triangular shaped cavity. An elastomeric seal is disposed in the triangular shaped cavity and is compressed between the opposing surfaces of the wheel assembly to prevent air leakage. When the nuts on the threaded stud bolts are loosened, air leakage past the elastomeric seal occurs prior to the nuts being removed from the studs.

SUMMARY OF THE INVENTION

This invention relates to an improved take apart safety vehicle wheel assembly including a disc, an inner rim joined to the disc, and an outer rim joined to the disc. The disc has a generally centrally located wheel mounting surface and includes an outer annular flange which defines an outer cylindrical surface. The inner rim includes an inboard tire bead seat retaining flange, an inboard tire bead seat, a generally axially extending well, and an outboard tire bead seat which terminates at an axial endmost surface. The outer rim includes an inner mounting surface and outer annular flange. The outer annular flange of the outer rim defines an outboard tire bead seat retaining flange of the take apart safety vehicle wheel assembly and includes an inner surface. An elastomeric member disposed in a cavity defined by the axial endmost surface of the inner rim, the inner surface of the outer annular flange of the outer rim, and the outer cylindrical surface of the outer annular flange of the disc. The take apart safety vehicle wheel assembly further includes only a single weld to join the disc to the inner rim; the outer rim being joined to the disc by a plurality of nuts and bolts which are adapted to compress the elastomeric member in the cavity so as to provide an air-tight seal in the take apart safety vehicle wheel assembly between the associated surfaces of the inner rim, the outer rim, and the disc.

Other advantages of this invention will become apparent to those skilled in the art from the following detailed description of the preferred embodiments, when read in light of the accompanying drawings.

BRIEF DESCRIPTION OF THE DRAWINGS

FIG. 1 is a sectional view of a portion of a first embodiment of a take apart safety vehicle wheel assembly constructed in accordance with this invention.

FIG. 2 is an enlarged sectional view of a portion of the take apart safety vehicle wheel assembly illustrated in FIG. 1.

FIG. 3 is an enlarged sectional view showing an alternative embodiment of an inner rim for use in the take apart safety vehicle wheel assembly illustrated in FIG. 1.

FIG. 4 is an enlarged sectional view of another portion of the take apart safety vehicle wheel assembly illustrated in FIG. 1.

DESCRIPTION OF THE PREFERRED EMBODIMENTS

Figure 5:
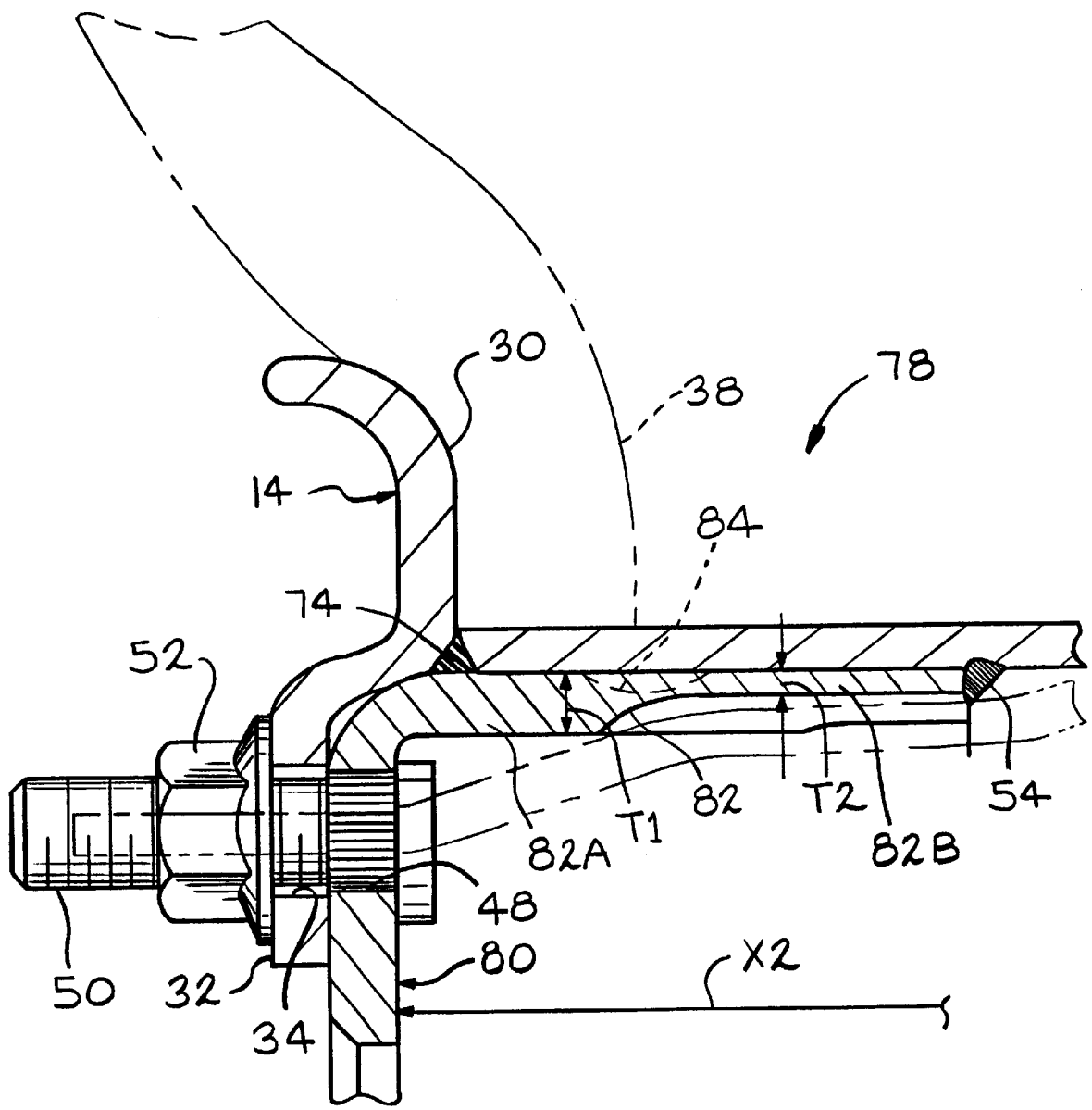
FIG. 5 is a sectional view of a portion of a second embodiment of a take apart safety vehicle wheel assembly constructed in accordance with this invention.

Referring now to the drawings, there is illustrated in FIG. 1 a first embodiment of a take apart safety vehicle wheel assembly, indicated generally at 10, and constructed in accordance with the present invention. The take-apart safety vehicle wheel assembly 10 includes an inner rim 12, an outer rim 14, and a disc 16. The inner rim 12 is fabricated from steel, aluminum, or other alloy materials and includes an inboard tire bead seat retaining flange 20, an inboard tire bead seat 22, a generally axially extending well 24, and an outboard tire bead seat 26. A conventional inflation valve turret (shown in phantom at 28), extends through and is mounted to the well 24 of the inner rim 12 and has an associated valve stem 28A for inflation of the associate vehicle wheel and tire assembly.

The outer rim 14 is fabricated from steel, aluminum, magnesium, 1o titanium, or other alloy materials and includes an outer annular flange 30 and an inner mounting surface 32. The outer annular flange 30 of the outer rim 14 defines an outboard tire bead seat retaining flange of the wheel assembly 10. As best shown in FIG. 4, the outer annular flange 30 of the outer rim 14 includes a generally curved or rounded inner surface indicated generally at 70. Alternatively, the surface 70 of the outer rim 70 can be other than illustrated. The inner mounting surface 32 of the outer rim 14 includes a plurality of stud receiving holes 34 formed therethrough (only one of such stud receiving holes 34 being shown in FIG. 1).

The disc 16 is forged, cast, fabricated, or otherwise formed from steel, aluminum, magnesium, titanium, or other alloy materials and defines an axis A. The disc 16 includes a generally centrally located wheel mounting surface 40 and an outer annular flange 42. The wheel mounting flange 40 is provided with a centrally located pilot aperture 44, a plurality of lug bolt receiving holes 46 (only one of such lug bolt receiving hole 46 being shown), spaced circumferentially around the pilot aperture 44, and a plurality of stud receiving holes 48 (only one of such stud receiving holes 48 being shown), spaced circumferentially around the pilot aperture 44. The lug bolt receiving holes 46 receive lug bolts and nuts (not shown) for securing the wheel assembly 10 on an axle (not shown) of a vehicle. The stud receiving holes 48 and 34 of the disc 16 and the outer rim 14, respectively, receive stud bolts 50 and nuts 52 to secure the outer rim 14 to the disc 16. The outer annular flange 42 of the disc 16 defines an outer cylindrical surface 72. The outer annular flange 42 is joined to the well 24 of the inner rim 12 by a weld 54.

As shown in FIG. 2, the outboard tire bead seat surface 26 of the inner rim 12 terminates at an axial endmost surface 60. The axial endmost surface 60 includes a radially extending first end surface 62, and a non-radially extending chamfered second end surface 64. As a result of this, when the vehicle wheel 10 is assembled, a generally equilateral triangular shaped cavity, indicated generally at 76, is defined between the inner surface 70 of the outer rim 14, the chamfered second end surface 64 of the inner rim 12, and the outer cylindrical surface 72 of the flange 42 of the disc 16. As shown in FIG. 1, an elastomeric seal 74 is disposed in the triangular shaped cavity 76 for providing an air-tight seal between the surfaces 70, 64, and 72 when the nuts 52 are tightened on the bolts 50 so as to compress the seal 74 within the cavity 76. Alternatively, as shown in FIG. 3, the outboard tire bead seat surface 26 of the inner rim 12 can terminate at an axial endmost surface 60A having a radially extending end surface 62A. In this case, a generally right angle triangular shaped cavity is defined between the surface 70 of the outer rim 14, the surface 62A of the inner rim 12, and the surface 72 of the disc 16 for receiving the elastomeric seal 74. Also, the surface 70 of the outer rim 14 can be a radially extending surface (not shown) so as to define a generally right angle triangular shaped cavity with the surface 64 of the inner rim 12 and the surface 72 of the disc 16.

As is known, the threads on the stud bolts 50 extend a sufficient distance so that in the event that the nuts 52 are loosened with the tire inflated (shown in FIG. 1 in phantom at 38), air can move past the elastomeric seal 74 to atmosphere prior to the nuts 52 being removed from the stud bolts 50.

Referring now to FIG. 5 and using the same reference numbers to indicate corresponding parts, there is illustrated a second embodiment of a take apart safety vehicle wheel assembly, indicated generally at 78, constructed in accordance with this invention. The take apart safety wheel assembly 78 includes a disc 80 having an outer annular flange 82 which is "extended" compared to the outer annular flange 42 of the disc 16 of the take apart safety vehicle wheel assembly 10 shown in FIG. 1. The outer annular flange 82 of the disc 80 defines a first section 82A and a second section 82B. The first section 82A defines a generally constant first thickness T1, and the second section 82B defines a generally constant second thickness T2 which is less than the first thickness T1. Also, in this embodiment, a bleed passageway, shown in phantom at 84, is provided in the disc 80.

Figure 6:
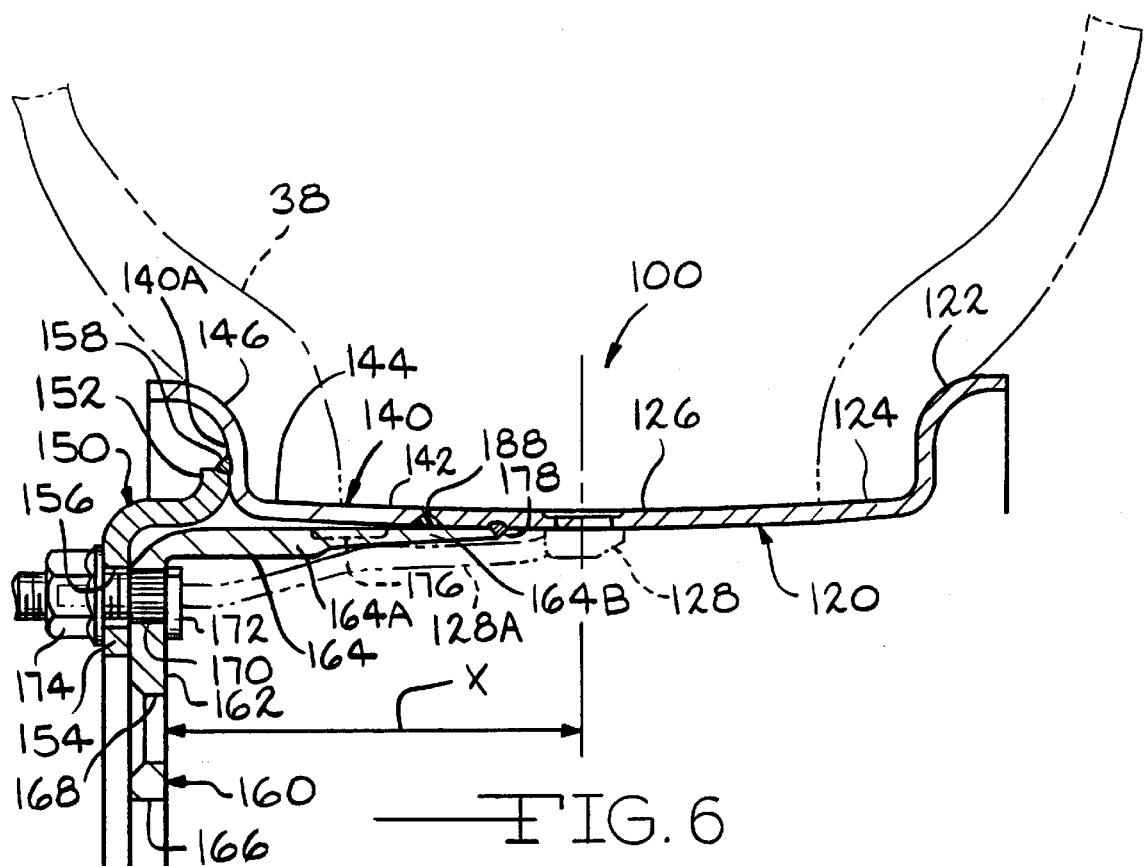
FIG. 6 is a sectional view of a portion of a third embodiment of a take apart safety vehicle wheel assembly constructed in accordance with this invention.
Figure 7:
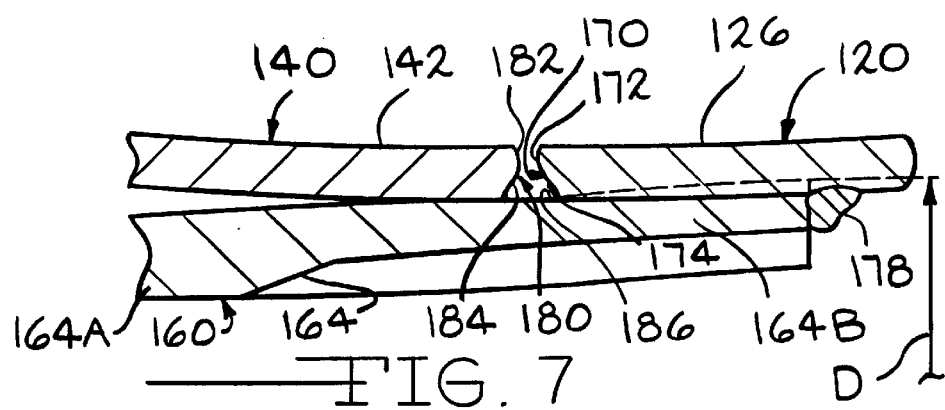
FIG. 7 is an enlarged sectional view of a portion of the take apart safety vehicle wheel assembly illustrated in FIG. 6.
Figure 8:
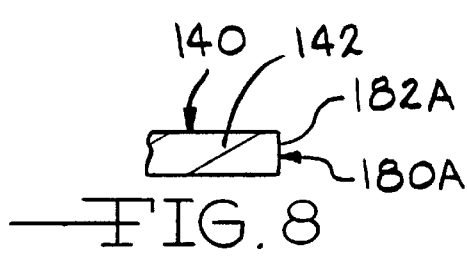
FIG. 8 is an enlarged sectional view showing an alternative embodiment of an outer rim for use in the take apart safety vehicle wheel assembly illustrated in FIG. 6.
Figure 9:
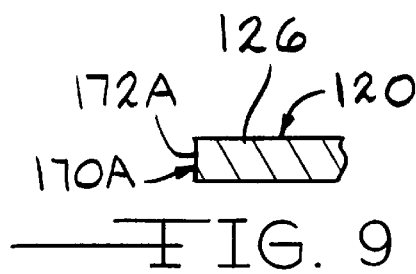
FIG. 9 is an enlarged sectional view showing an alternative embodiment of an inner rim for use in the take apart safety vehicle wheel assembly illustrated in FIG. 6.

Referring now to FIGS. 6 and 7, there is illustrated a third embodiment of a take apart safety vehicle wheel assembly, indicated generally at 100, and constructed in accordance with the present invention. The take apart safety vehicle wheel assembly 100 includes an inner rim 120, an outer rim 140, a clamp ring 150, and a disc 160.

The inner rim 120 is fabricated from steel, aluminum, magnesium, titanium, or other alloy materials and includes an inboard tire bead seat retaining flange 122, an inboard tire bead seat 124, and a generally axially extending well portion 126. A conventional inflation valve turret (shown in phantom at 128), extends through and is mounted to the well 124 of the inner rim 112 and has an associated valve stem 128A for inflation of the associate vehicle wheel and tire assembly. The outer rim 140 is fabricated from steel, aluminum, magnesium, titanium, or other alloy materials and includes a generally axially extending well portion 142, an outboard tire bead seat 144, and an outboard tire bead seat retaining flange 146.

The clamp ring 150 is formed from steel, aluminum, magnesium, titanium, or other alloy materials and includes an outer annular flange 152 and an inner mounting surface 154. The inner mounting surface 154 includes a plurality of stud receiving holes 156 formed therethrough (only one of such stud receiving holes 156 being shown). The outer annular flange 152 of the clamp ring 150 is offset radially inwardly relative to the inner mounting surface 154 thereof, and is joined to a generally radially extending outer surface 140A of the outer rim 140 by a weld 158.

The disc 160 is forged, cast, fabricated, or otherwise formed from steel, aluminum, magnesium, titanium, or other alloy materials and includes a generally centrally located wheel mounting surface 162 and an outer annular flange 164. The wheel mounting flange 162 is provided with a centrally located is pilot aperture 166, a plurality of lug bolt receiving holes 168 (only one of such lug bolt receiving hole 168 being shown), and a plurality of stud receiving holes 170 (only one of such stud receiving holes 170 being shown). The lug bolt receiving holes 168 receive lug bolts and nuts (not shown) for securing the wheel assembly 100 on an axle (not shown) of a vehicle. The stud receiving holes 170 and 156 of the disc 160 and the clamp ring 150, respectively, receive stud bolts 172 and nuts 174 to secure the clamp ring 150 to the disc 160.

The outer annular flange 164 of the disc 160 defines a first section 164A and a second section 164B. The first section 164A defines a generally constant first thickness, and the second section 164B defines a generally constant second thickness which is less than the first thickness. Also, in this embodiment, a bleed passageway, shown in phantom at 176, is provided in the flange 164 of the 160.

The outer annular flange 164 of the disc 160 is joined to the well portion 126 of the inner rim 120 by a weld 178. Also, as shown in FIG. 7, the second section 164B of the disc 160 is preformed in such a manner in order to define an outer diameter (shown by phantom dimension D) which is slightly greater than the inner diameter defined by the inner rim 120 so that the second section 164B is positioned against the inner rim 120 in a press-fit relationship (the outer diameter D being shown exaggerated for clarity).

As best shown in FIG. 7, the outboard end of the well portion 126 of the inner rim 120 terminates at an axial endmost surface 170. The axial endmost surface 170 includes a radially extending first end surface 172, and a non-radially extending chamfered second end surface 174. The inboard end of the well portion 142 of the outer rim 140 terminates at an axial endmost surface 180.

The axial endmost surface 180 includes a radially extending first end surface 182, and a non-radially extending chamfered second end surface 184. As a result of this, a generally equilateral triangular shaped cavity is defined between the surface 174 of the inner rim 140, the surface 184 of the outer rim 12, and an outer surface 186 of the flange 164 of the disc 160 for receiving an elastomeric seal 188.

Alternatively, the inboard end of the well portion 142 of the outer rim 140 can terminate at an axial endmost surface 180A having a radially extending end surface 182A, or the outboard end of the wheel portion 126 of the inner rim 120 can terminate at an axial endmost surface 170A having a radially extending end surface 172A. In this case, a generally right angle triangular shaped cavity is defined between the respective adjacent surfaces 182A, 174, and 186 or 184, 172A, and 186 of the outer rim 140, the inner rim 120, and the disc 160 for receiving the elastomeric seal 188.

Figure 10:
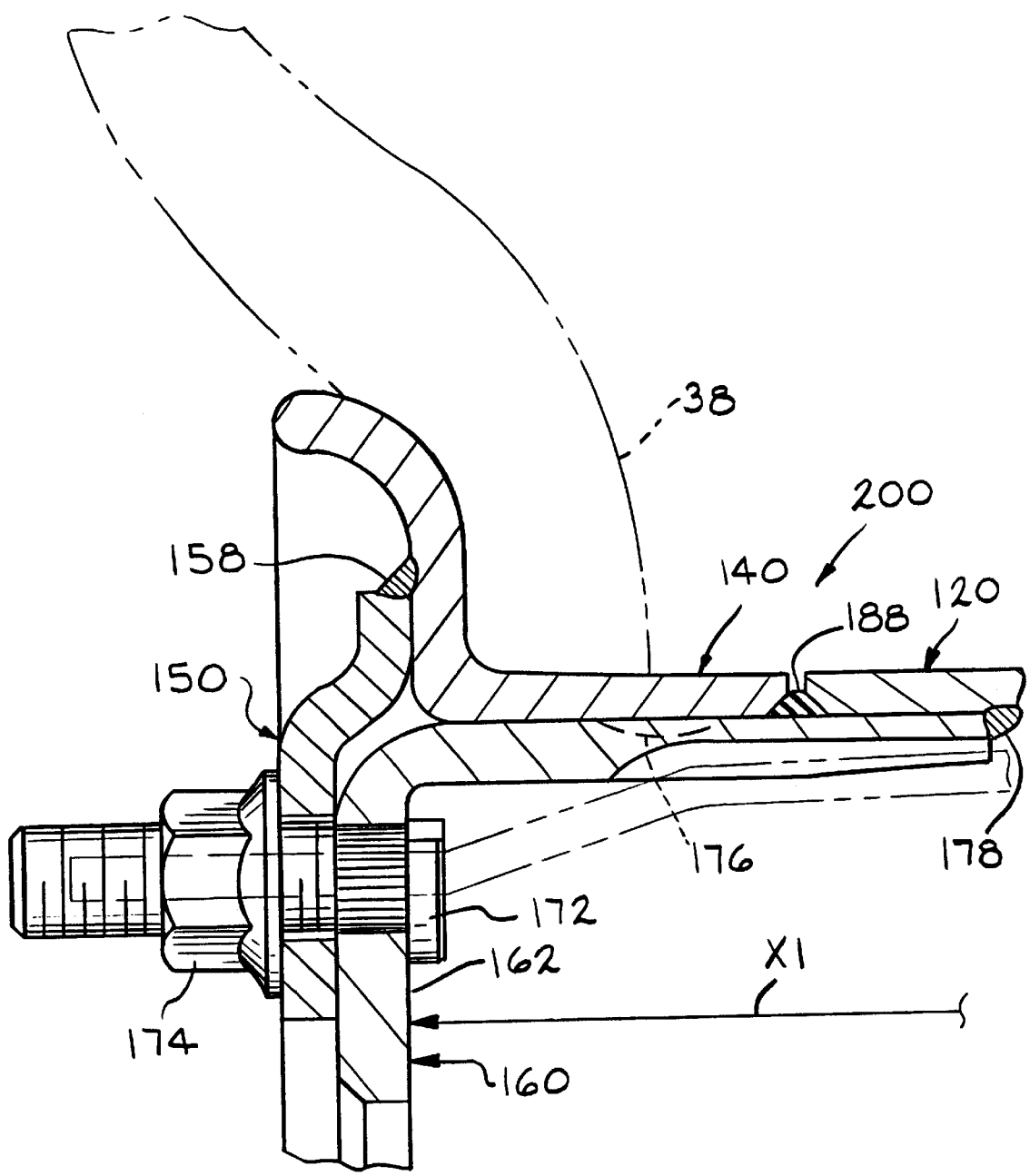
FIG. 10 is a sectional view of a portion of a fourth embodiment of a take apart safety vehicle wheel assembly in accordance with this invention.

Referring now to FIG. 10 and using the same reference numbers to indicate corresponding parts, there is illustrated a fourth embodiment of a take apart safety vehicle wheel assembly, indicated generally at 200, constructed in accordance with this invention. The take apart safety vehicle wheel 200 is similar to the take apart safety vehicle wheel 100 illustrated in FIGS. 6 and 7 except that a wheel offset X1 of the wheel 200 is less than a wheel offset X of the take apart safety vehicle wheel 100. As used herein, the term wheel offset is defined as the distance from the mounting surface 162 of the disc 160 to the centerline of the associated wheel.

One advantage of this invention is that the number of components needed to produce the take apart safety vehicle wheels 10 and 78 of this invention is less than the number of components needed to produce the prior art take apart safety vehicle wheel disclosed in U.S. Pat. No. 4,836,261 to Weeks et al. Also, the number of welds needed to produce the take apart safety vehicle wheels 10 and 78 of this invention is less than the number of welds needed to produce the prior art take apart safety vehicle wheel disclosed in U.S. Pat. No. 4,836,261 to Weeks et al. In addition, the take apart safety vehicle wheels 10, 78, 100, and 200 of this invention can be assembled to produce a triangular shaped cavity for receiving the elastomeric seal, shown as being an equilateral or right triangular shaped cavity, with reduced machined compared to the machining needed to form the equilateral triangular shaped seal cavity in the prior art take apart safety vehicle wheel disclosed in U.S. Pat. No. 4,836,261 to Weeks et al. In addition, the take apart safety vehicle wheels 10, 78, 100, and 200 of this invention provide a respective wheel offset X3, X2, X, and X1 which is greater than that disclosed in U.S. Pat. No. 4,836,261 to Weeks et al.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A take apart safety vehicle wheel assembly comprising:
   a disc having a generally centrally located wheel mounting surface and including an outer annular flange, said outer annular flange of said disc defining an outer cylindrical surface;
   an inner rim joined to said disc, said inner rim including an inboard tire bead seat retaining flange, an inboard tire bead seat, a generally axially extending well, and an outboard tire bead seat, said outboard tire bead seat surface of said inner rim including an axial endmost surface, said axial endmost surface including a radially extending first end surface and a non-radially extending chamfered second end surface;
   an outer rim joined to said disc, said outer rim including an outer annular flange and an inner mounting surface, said outer annular flange defining an outboard tire bead seat retaining flange of the take apart safety vehicle wheel assembly, said outer annular flange of said outer rim having a generally curved inner surface; and
   an elastomeric member disposed in a cavity defined by said non-radially extending chamfered second end surface of said inner rim, said generally curved inner surface of said outer annular flange of said outer rim, and said outer cylindrical surface of said outer annular flange of said disc, said non-radially extending chamfered second end surface of said inner rim, said generally curved inner surface of said outer annular flange of said outer rim, and said outer cylindrical surface of said outer annular flange of said disc cooperating to define a generally equilateral triangular shaped cavity;
   wherein only a single weld is used to join said disc to said inner rim, said outer rim being joined to said disc by a mechanical fastening means, said mechanical fastening means adapted to compress said elastomeric member in said cavity so as to provide an air-tight seal in said take apart safety vehicle wheel assembly between said axial endmost surface of said inner rim, said inner surface of said outer annular flange of said outer rim, and said outer cylindrical surface of said outer annular flange of said disc.

2. take apart safety vehicle wheel assembly comprising:
   a clamp ring including an outer annular flange and an inner mounting surface;
   a disc defining an axis and releasably joined to said clamp ring, said disc including a generally centrally located wheel mounting surface and an outer annular flange, said disc defining a first cavity surface; and
   an inner rim permanently joined to said disc, said inner rim including an inboard tire bead seat retaining flange, an inboard tire bead seat, and at least a portion of a generally axially extending well, said inner rim defining a second cavity surface;
   an outer rim including an outboard tire bead seat retaining flange, an outboard tire bead seat, and at least a portion of said generally axially extending well, said outer rim defining a third cavity surface; and
   an elastomeric member disposed in a cavity defined by said first cavity surface of said disc, said second cavity surface of said inner rim, and said third cavity surface of said outer rim;
   wherein said outer annular flange of said clamp ring is offset radially inwardly relative to said inner mounting surface of said clamp ring, said offset outer annular flange of said clamp ring being permanently joined by a weld to a generally radially extending outer surface of said outer rim by a weld.

3. The take apart safety vehicle wheel assembly defined in claim 2 wherein said second cavity surface is a non-radially extending chamfered second end surface.

4. The take apart safety vehicle wheel assembly defined in claim 3 wherein said first cavity surface, said non-radially extending chamfered end surface of second cavity surface, and said third cavity surface cooperate to define a generally right angle triangular shaped cavity.

5. The take apart safety vehicle wheel assembly defined in claim 2 wherein said third cavity surface is a non-radially extending chamfered end surface.

6. The take apart safety vehicle wheel assembly defined in claim 5 wherein said first cavity surface, said second cavity surface, and said non-radially extending chamfered end surface of said third cavity surface cooperate to define a generally right angle triangular shaped cavity.

7. The take apart safety vehicle wheel assembly defined in claim 2 wherein said second cavity surface is a non-radially extending chamfered end surface and said third cavity surface is a non-radially extending chamfered end surface.

8. The take apart safety vehicle wheel assembly defined in claim 7 wherein said first cavity surface, said non-radially extending chamfered end surface of second cavity surface, and said non-radially extending chamfered end surface of said third cavity surface cooperate to define a generally equilateral triangular shaped cavity.

* * * * *